US012597418B2

(12) United States Patent
Kang et al.

(10) Patent No.: US 12,597,418 B2
(45) Date of Patent: Apr. 7, 2026

(54) AUDIO SIGNAL PROCESSING DEVICE AND METHOD FOR SYNCHRONIZING SPEECH AND TEXT BY USING MACHINE LEARNING MODEL

(71) Applicant: GAUDIO LAB, INC., Seoul (KR)

(72) Inventors: Minsung Kang, Seoul (KR); Sangbae Chon, Seoul (KR)

(73) Assignee: GAUDIO LAB, INC., Seoul (KR)

( * ) Notice: Subject to any disclaimer, the term of this patent is extended or adjusted under 35 U.S.C. 154(b) by 132 days.

(21) Appl. No.: 18/614,575

(22) Filed: Mar. 22, 2024

(65) Prior Publication Data

US 2024/0321265 A1    Sep. 26, 2024

(30) Foreign Application Priority Data

Mar. 24, 2023    (KR) ........................ 10-2023-0038587

(51) Int. Cl.
*G10L 15/04* (2013.01)
*G10L 15/02* (2006.01)
(Continued)

(52) U.S. Cl.
CPC .............. *G10L 15/16* (2013.01); *G10L 15/02* (2013.01); *G10L 15/063* (2013.01)

(58) Field of Classification Search
CPC ....... G10L 15/04; G10L 15/16; G10L 21/055; G10L 15/005; G10L 15/02; G10L 25/51; (Continued)

(56) References Cited

U.S. PATENT DOCUMENTS

2006/0149558 A1* 7/2006 Kahn ..................... G10L 15/063
704/278
2009/0006087 A1* 1/2009 Imoto ...................... G10L 13/00
704/E21.001
(Continued)

FOREIGN PATENT DOCUMENTS

CN        105280177        1/2016
CN        110379412        6/2022
(Continued)

OTHER PUBLICATIONS

Office Action dated Jul. 8, 2025 for Japanese Patent Application No. 2024-045057 and its English translation provided by Applicant's foreign counsel.
(Continued)

*Primary Examiner* — Jakieda R Jackson
(74) *Attorney, Agent, or Firm* — WOMBLE BOND DICKINSON (US) LLP

(57)        ABSTRACT

Disclosed is an audio signal processing device for synchronizing an audio signal and text with a speech signal, the audio signal including speech and the text corresponding to the speech. A processor of the audio signal processing device obtains first audio pronunciation information corresponding to the speech, the first audio pronunciation information being divided with regard to multiple frames included in the audio signal, and obtains first text pronunciation information corresponding to the text, the first text pronunciation information being divided with regard to multiple segments. The processor obtains information indicating a correlation between second audio pronunciation information, which is a feature extracted from each of the multiple frames of the first audio pronunciation information, and second text pronunciation information, which is a feature extracted from each of the multiple segments of the first text pronunciation (Continued)

information, and synchronizes the text with the speech signal according to the information indicating the correlation.

10 Claims, 4 Drawing Sheets

(51) Int. Cl.
    *G10L 15/06*         (2013.01)
    *G10L 15/16*         (2006.01)

(58) Field of Classification Search
    CPC . G10L 2015/025; G10L 15/063; G10L 15/12;
               G10L 15/26; G06F 40/20; G06N 3/0464;
                         G06N 3/044; G06N 3/08
    See application file for complete search history.

(56)                    References Cited

U.S. PATENT DOCUMENTS

| | | | |
|---|---|---|---|
| 2012/0143611 A1* | 6/2012 | Qian ........................ | G10L 13/07 704/260 |
| 2015/0149181 A1* | 5/2015 | Delahaye ................ | G10L 13/08 704/260 |
| 2016/0012035 A1 | 1/2016 | Tachibana et al. | |
| 2020/0273451 A1* | 8/2020 | Kim ........................ | G10L 15/22 |
| 2021/0042579 A1* | 2/2021 | Chen ..................... | G06N 3/0464 |
| 2021/0390946 A1 | 12/2021 | Wang et al. | |
| 2022/0044463 A1* | 2/2022 | Kang .................... | G06T 13/205 |
| 2022/0076133 A1* | 3/2022 | Yang ........................ | G06N 3/09 |
| 2022/0180528 A1* | 6/2022 | Dundar ................... | G06N 3/04 |
| 2022/0207321 A1* | 6/2022 | Gulati .................. | G06N 3/0455 |
| 2023/0229921 A1* | 7/2023 | Fedorov ............... | G06N 3/0442 706/25 |
| 2023/0360557 A1* | 11/2023 | Balakrishnan ..... | G06V 10/7715 |
| 2024/0013791 A1 | 1/2024 | Murata et al. | |

FOREIGN PATENT DOCUMENTS

| | | |
|---|---|---|
| EP | 3 933 829 | 1/2022 |
| JP | 2016-20972 | 2/2016 |
| JP | 2021-43338 | 3/2021 |
| JP | 2022-529641 | 6/2022 |
| WO | 2021/042870 | 3/2021 |
| WO | 2022/113218 | 6/2022 |

OTHER PUBLICATIONS

Office Action (1st) dated Mar. 11, 2025 for Japanese Patent Application No. 2024-045057 and its English translation provided by Applicant's foreign counsel.

\* cited by examiner text :      It's a beautiful day

↓

IPA :      ɪts ə ˈbjutəfəl deɪ

↓ token :    55, 29, 28, 0, 49, 0, 70, 3, 15, 34,
           29, 49, 12, 49, 19, 0, 5, 10, 55

| | MAE ↓ | MedAE ↓ | Perc ↑ | Mauch$_{0.3}$ ↑ | Mauch$_{0.2}$ ↑ |
|---|---|---|---|---|---|
| ST | 0.38 | 0.097 | 76.8% | 0.87 | 0.82 |
| VA | 0.37 | N/A | N/A | 0.92 | N/A |
| GU | 0.22 | 0.050 | N/A | 0.94 | N/A |
| EM | 0.31 | 0.050 | N/A | 0.93 | N/A |
| GTS-D | 0.42 | 0.043 | 83.7% | 0.89 | 0.87 |
| GTS-IH | 0.16 | 0.043 | 89.0% | 0.93 | 0.91 |

FIG. 5

AUDIO SIGNAL PROCESSING DEVICE AND METHOD FOR SYNCHRONIZING SPEECH AND TEXT BY USING MACHINE LEARNING MODEL

CROSS-REFERENCE TO RELATED APPLICATION(S)

This application is based on and claims priority under 35 U.S.C. 119 to Korean Patent Application No. 10-2023-0038587, filed on Mar. 24, 2023, in the Korean Intellectual Property Office, the disclosure of which is herein incorporated by reference in its entirety.

BACKGROUND OF THE INVENTION

Field of the Invention

The disclosure relates to a method and a device for processing an audio signal, wherein text is synchronized with speech included in the audio signal by using a machine learning model.

Description of the Prior Art

With the development of a machine learning model, a method of using a machine learning model for image and video processing has been discussed. Machine learning models have been used to identify objects included in images or to search for objects included in images. Recently, machine learning models have been applied not only to image and video processing, but also to audio. In particular, methods are being discussed to replace manual work done by humans with a machine learning model. For example, methods have been introduced to convert speech to text or text to speech by using a machine learning model. Accordingly, machine learning models that can synchronize text and speech included in audio signals, for example, lyrics and songs, are also being discussed.

For example, an audio signal processing device may use dynamic time warping (DTW), which is a type of forced alignment algorithm, to synchronize text and speech included in an audio signal. In DTW, the audio signal processing device compares two pieces of time-series data, and sequentially finds, starting from a first time point of first time-series data, a time point at which data of time points of the first time-series data and data of time points of the second time-series data have the most similarity. A distance between a time point of the first time series and a time point of the second time series corresponding thereto is called a warping distance, and the audio signal processing device finds an optimal warping path that minimizes the warping distance. The audio signal processor aligns speech and text according to the optimal warping path. The audio signal processor allows the input audio and input text to be converted into the same latent feature space. The audio signal processing device may use non-negative matrix factorization (NMF) to extract audio features and may use vowel class tokens as text features.

Further, the audio signal processing device may use a Viterbi algorithm, which is a type of forced alignment algorithm, to synchronize speech and text. In particular, the Viterbi algorithm is suitable for automatic speech recognition (ASR) models. ASR models output pronunciation or character token logits by frame units from speech. Therefore, the audio signal processing device may align speech and text by using the Viterbi algorithm on the output of ASR models and text. However, these methods may cause a problem since the alignment performance deteriorates due to the case of songs in which specific sounds, such as specific words, are likely to be repeated.

SUMMARY OF THE INVENTION

An embodiment of the disclosure is to provide a method and a device for processing an audio signal, wherein text is synchronized with speech included in the audio signal by using a machine learning model.

An audio signal processing device for synchronizing an audio signal and text with a speech signal, the audio signal including speech and the text corresponding to the speech, according to an embodiment of the disclosure includes a processor, wherein the processor is configured to obtain first audio pronunciation information corresponding to the speech, the first audio pronunciation information being divided with regard to multiple frames included in the audio signal, obtain first text pronunciation information corresponding to the text, the first text pronunciation information being divided with regard to multiple segments, obtain information indicating a correlation between second audio pronunciation information, which is a feature extracted from each of the multiple frames of the first audio pronunciation information, and second text pronunciation information, which is a feature extracted from each of the multiple segments of the first text pronunciation information, and synchronize the text with the speech signal according to the information indicating the correlation.

The processor may be configured to extract the speech from a component representing a language uttered in the audio signal.

The processor may be configured to convert the text to a code corresponding to the text, and obtain the first text pronunciation information based on the converted code.

The converted code may be an international phonetic alphabet (IPA).

The correlation between the second audio pronunciation information and the second text pronunciation information may be a cross-correlation.

The processor may be configured to obtain a similarity between the second audio pronunciation information and the second text pronunciation information, and obtain, based on the similarity, a time stamp indicating a time at which each of the multiple segments of the text corresponding to each of the multiple segments of the second audio pronunciation information corresponds to an audio signal.

The processor may be configured to obtain the similarity by using a neural network model.

The neural network model has a UNet structure, the UNet includes a CNN and an RNN, and within a layer included in the UNet, the CNN may perform analysis on a local similarity region, and the RNN may perform analysis on a global similarity region.

The neural network model may be trained using a loss function having, as an output value, a difference between a time at which speech corresponding to each of the multiple segments of the text is uttered in the audio signal and a predicted time at which each of the multiple segments of the text is expected to be synchronized with the audio signal.

The loss function may use cross-entropy.

According to an embodiment of the disclosure, a machine learning device for generating a neural network model configured to synchronize an audio signal and text with a speech signal, in which the audio signal includes speech and text corresponds to the speech, includes a processor. The processor may be configured to obtain first audio pronunciation information corresponding to the speech, the first audio pronunciation information being divided with regard to multiple frames included in the audio signal, obtain first text pronunciation information corresponding to the text, the first text pronunciation information being divided with regard to multiple segments, obtain information indicating a correlation between second audio pronunciation information, which is a feature extracted from each of the multiple frames of the first audio pronunciation information, and second text pronunciation information, which is a feature extracted from each of the multiple segments of the first text pronunciation information, and learn to synchronize text with the audio signal according to the information indicating the correlation.

The processor may be configured to extract the speech from a component representing a language uttered in the audio signal.

The processor may be configured to convert the text to a code corresponding to the text, and obtain the first text pronunciation information based on the converted code.

The converted code may be an international phonetic alphabet (IPA).

The correlation between the second audio pronunciation information and the second text pronunciation information may be a cross-correlation.

The processor may be configured to obtain a similarity between the second audio pronunciation information and the second text pronunciation information, and obtain, based on the similarity, a time stamp indicating a time at which each of the multiple segments of the text corresponding to each of the multiple segments of the second audio pronunciation information corresponds to an audio signal.

The neural network model has a UNet structure, the UNet includes a CNN and an RNN, and within a layer included in the UNet, the CNN may perform analysis on a local similarity region, and the RNN may perform analysis on a global similarity region.

The neural network model may be trained using a loss function having, as an output value, a difference between a time at which speech corresponding to each of the multiple segments of text is uttered in the audio signal and a predicted time at which each of the multiple segments of text is expected to be synchronized with the audio signal.

The loss function may use cross-entropy.

A device and a method according to an embodiment of the disclosure can provide a method and a device for processing an audio signal, wherein text is synchronized with speech included in the audio signal by using a machine learning model.

BRIEF DESCRIPTION OF THE DRAWINGS

The above and other aspects, features, and advantages of the disclosure will be more apparent from the following detailed description taken in conjunction with the accompanying drawings, in which:

FIG. 5 illustrates the results of testing synchronization of lyrics to multiple songs by using a prediction model according to an embodiment of the disclosure and the predictive performance of an existing model.

DETAILED DESCRIPTION OF THE EXEMPLARY EMBODIMENTS

Figures 1, 2:
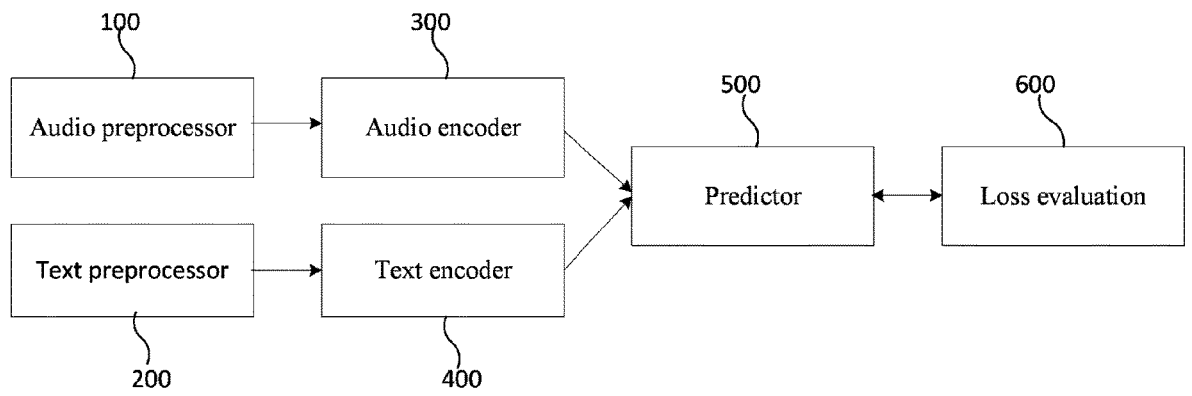
FIG. 1 is a block diagram illustrating a process by which an audio signal processing device trains a predictor, according to an embodiment of the disclosure.
FIG. 2 illustrates an aspect in which English text is converted into IPA tokens by a text preprocessor.

Hereinafter, embodiments of the disclosure are described in detail with reference to the accompanying drawings, so that those skilled in the art may easily implement the disclosure. However, the disclosure may be embodied in a variety of different forms and is not limited to the embodiments described herein. In order to clearly explain the disclosure with reference to the drawings, parts that are not pertinent to the description have been omitted, and similar parts are given similar reference numerals throughout the specification. Further, when we say that a part "includes" certain components, this does not mean that it excludes other components, and unless specifically stated to the contrary, it may also include other components.

FIG. 1 is a block diagram illustrating a process by which an audio signal processing device trains a predictor, according to an embodiment of the disclosure.

The process of training the predictor by the audio signal processing device according to an embodiment of the disclosure may be explained separately based on software function blocks, that is, an audio pre-processor 100, a text pre-processor 200, an audio encoder 300, and a text encoder 400, a predictor 500, and a loss evaluation 600. These software functional blocks may operate on one or more processors.

The audio preprocessor 100 extracts speech included in an input audio signal to obtain pronunciation information corresponding to the speech. Specifically, the audio preprocessor 100 may extract speech from components representing a language uttered in the input audio signal. For ease of explanation, pronunciation information corresponding to the speech is referred to as first audio pronunciation information. Here, the audio preprocessor 100 may use a predetermined speech extraction method. Further, the audio preprocessor 100 may convert the extracted speech into pronunciation information, for example, a Mel spectrogram or FFT spectrogram. Specifically, the audio preprocessor 100 may convert the speech extracted from the input audio signal into an STFT signal, and may convert the STFT signal into a Mel spectrogram by using a Mel filter bank. Further, the audio preprocessor 100 may sample the audio signal corresponding to the extracted speech. Here, the audio preprocessor 100 may adjust sampling units according to alignment units.

The text preprocessor 200 performs conversion of input text so as to extract features from the input text. Specifically, the text preprocessor 200 may convert the input text into pronunciation information. For ease of explanation, pronunciation information corresponding to text is referred to as first text pronunciation information. Here, the pronunciation information may be an international phonetic alphabet (IPA) token. Here, a predefined conversion method suitable for a language of text may be used to convert the text into an IPA token. For example, Python libraries [eng2ipa, Kopron] may be used to convert English and Korean text. FIG. 2 shows that English text is converted into an IPA token by the text preprocessor 200. Additionally, the text preprocessor 100 may remove characters that are not related to pronunciation before converting the input text into IPA tokens. Here, characters that are not related to pronunciation may be punctuation marks or "-" which corresponds to prolonged sound expression in Japanese. Punctuation marks may include at least one of "?", "!", ",", and ".".

Figure 3:
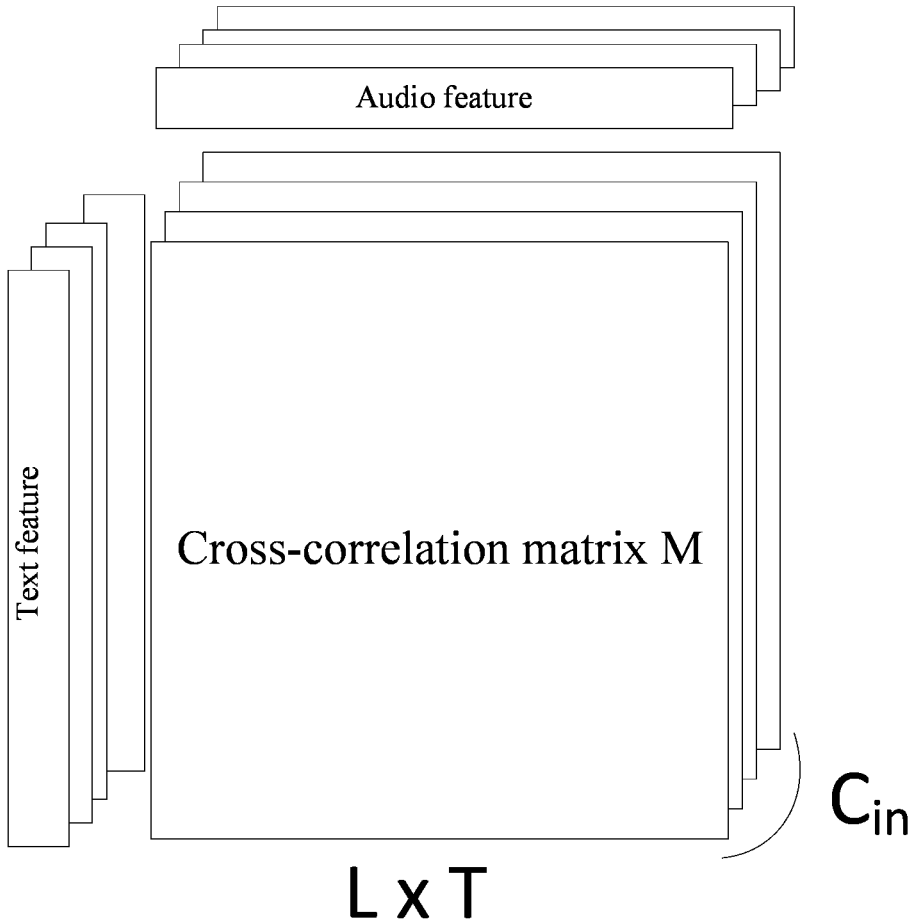
FIG. 3 illustrates a linear layer added to CBHG according to an embodiment of the disclosure.

The audio encoder 300 encodes the first audio pronunciation information obtained by the audio signal pre-processor 100 into an input format for the predictor. The text encoder 400 encodes the first text pronunciation information obtained by the text preprocessor 200 into an input format for the predictor. Specifically, the audio encoder 300 and the text encoder 400 may use a CBHG (convolution bank+ highway+GRU). The CBHG is an architecture that combines a one-dimensional (1D) convolutional bank, a highway network, and a gated recurrent unit (GRU), and is used to extract features from long sequences. The 1D convolutional bank performs convolutional operations on the pre-processed input to obtain a matrix, and performs max pooling on the obtained matrix. Thereby, the audio encoder 300 and the text encoder 400 extract second audio pronunciation information and second text information reflecting the sequence features of the audio signal and the text, from the first audio pronunciation information and the first text pronunciation information. In this case, the sequence features may include at least one of prolonged sound and repeated words. The highway network amplifies the important features among the features extracted from the 1D convolutional bank. Further, the GRU outputs features reflecting a correlation between consecutive sequences. A linear layer may be added at the end of the CBHG to increase the number of channels. FIG. 3 illustrates a linear layer added to the CBHG according to an embodiment of the disclosure.

In FIG. 3, $C_{in}$ represents the number of channels output after the linear layer. Further, L represents the number obtained by dividing preprocessed text of IPA, e.g., IPA tokens by the unit of processing. L may be the number of sentences corresponding to IPA tokens. In addition, T represents the number obtained by dividing preprocessed audio signals, e.g., audio signals of speech, by the unit of processing. T may represent the number of time frames corresponding to the preprocessed audio signal. A tensor with the shape of $C_{encoder} \times L \times T$ output by the CBHG is converted into a tensor of $C_{in} \times L \times T$ by a linear layer.

According to a specific embodiment, in addition to CBHG, other models, for example, RNN or LSTM, capable of extracting features from long-length sequences may be used.

Figure 4:
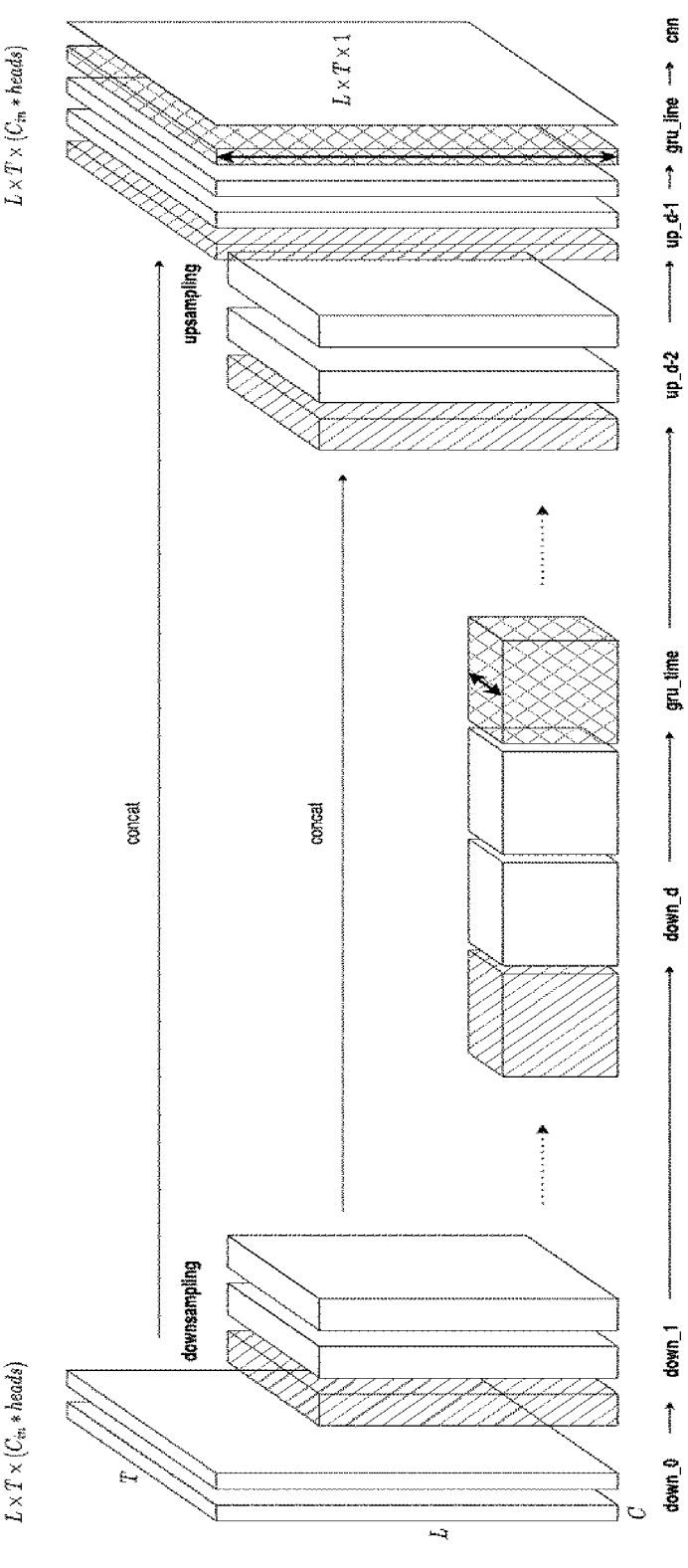
FIG. 4 illustrates a specific structure of a predictor according to an embodiment of the disclosure.

The predictor 500 synchronizes text with an audio signal based on a correlation between the second audio pronunciation information, which is a feature extracted from each of multiple frames of the first audio pronunciation information, and the second text pronunciation information, which is a feature extracted from each of multiple segments of the first text information. Specifically, the predictor 500 may synchronize text with an audio signal based on a cross-correlation between the second audio pronunciation information extracted from each of the multiple frames of the first audio pronunciation information and the second text pronunciation information extracted from each of the multiple segments of the first text pronunciation information. Here, the predictor 500 may output a timestamp of an audio signal corresponding to each segment of text. The timestamp may be the start time of the segment of the second text pronunciation information used for the prediction. Specifically, the predictor 500 may synchronize text with an audio signal based on a matrix representing the correlation of $C_{in} \times L \times T$ tensors described above. The predictor 500 may output a L×T tensor representing a similarity between the second audio pronunciation information and the second text pronunciation information. Further, the predictor 500 may output the time information of the frame of the second audio pronunciation information that has the highest correlation with the highest correlated second text pronunciation information. Here, the predictor 500 may use an argmax function. The predictor 500 may be a UNet structure in which GRUs are used. The UNet may be configured by a combination of CNNs and RNNs. Within layers included in the UNet, the CNN may perform analysis on a local similarity region. Further, within layers included in the UNet, the RNN may perform analysis on a global similarity region. The initial two-dimensional convolutional layer of the predictor 500 may output a 32-channel tensor. The channel size is doubled after each pooling layer. At each depth level, there are two convolutional layers and skip connections between downsampling and up-sampling. FIG. 4 shows a specific structure of the predictor 500 according to an embodiment of the disclosure.

The predictor 500 may be trained using a loss function 600 where a loss is a difference between a timestamp at which the text should be output, i.e., a time at which a speech corresponding to each of the multiple segments of the text that corresponds to each of the multiple segments of the second text pronunciation information is uttered in the audio signal, and a timestamp predicted by the predictor 500. In this case, the loss may be a cross-entropy loss along the time axis.

The predictor 500 trained through such a training process may perform well at synchronizing text and speech where similar or identical words are repeated or appear multiple times, such as in song lyrics.

When synchronizing text and speech, the predictor 500 may make predictions in two stages. For example, the predictor 500 may predict a timestamp of a first unit of text and output a timestamp of a second unit of text. The first unit may be a larger unit than the second unit. Specifically, the first unit may be a sentence and the second unit may be a word.

FIG. 5 illustrates the results of testing synchronization of lyrics to multiple songs by using a prediction model according to an embodiment of the disclosure and the predictive performance of an existing model.

In FIG. 5, ST is a prediction model of D. Stoller, S. Durand, and S. Ewert, "End-to-end lyrics alignment for polyphonic music using an audio-to character recognition model," released in ICASSP 2019-2019 IEEE International Conference on Acoustics, Speech and Signal Processing (ICASSP). IEEE, 2019, pp. 181-185". Further, in FIG. 5, VA is a prediction model of A. Vaglio, R. Hennequin, M. Moussallam, G. Richard, and F. d'Alché Buc, "Multilingual lyrics-to-audio alignment," released in International Society for Music Information Retrieval Conference (ISMIR), 2020. In FIG. 5, GU is a prediction model of C. Gupta, E. Yılmaz, and H. Li, "Automatic lyrics alignment and transcription in polyphonic music: Does background music help?" published in ICASSP 2020-2020 IEEE International Conference on Acoustics, Speech and Signal Processing (ICASSP). IEEE, 2020, pp. 496-500. In addition, in FIG. 5, GTS-D is a model in which the prediction model according to the embodiment of the disclosure is trained using DALI. Furthermore, in FIG. 5, GTS-IH is a model in which the prediction model according to an embodiment of the disclosure is trained using Gaudio Lab's internal data. In FIG. 5, evaluation metrics are the mean absolute error (MAE), Med (AE) median absolute error (MedAE), Perc, and Mauch metrics. Perc represents the length of a section in which prediction is performed accurately among the total length of the audio signal. Mauch metric represents a proportion in which a predicted time exists within a predetermined section from the actual audio time. Equation 1 shows a method of measuring the MAE in FIG. 5, Equation 2 shows a method of measuring the MedAE in FIG. 5, Equation 3 shows a method of measuring the Perc in FIG. 5, and Equation 4 shows a method of measuring the Mauch metric.

$$MAE = \frac{\sum_{w=1}^{W} |t_{pred}^w - t_{ref}^w|}{W} \quad \text{[Equation 1]}$$

$$MedAE = \text{median}\left(|t_{pred}^w - t_{ref}^w|\right) \quad \text{[Equation 2]}$$

$$Perc = \frac{\sum_{w=1}^{W} \max\left(\min\left(e_{ref}^w, e_{pred}^w\right) - \max\left(t_{ref}^w, t_{pred}^w\right), 0\right)}{\text{Duration}} \quad \text{[Equation 3]}$$

$$\text{Mauch}_\tau = \frac{\sum_{w=1}^{W} \mathbb{1}_{|t_{pred}^w - t_{ref}^w| < \tau}}{W} \quad \text{[Equation 4]}$$

In the equation, W refers to the total number of words in a song and w refers to the index of a word. Furthermore, $t^w_{pred}$ refers to predicted start time for the word corresponding to word index w, and $t^w_{ref}$ represents actual start time for the word corresponding to word index w. $e^w$ refers to the end time of the word. The results of FIG. 5 are evaluated for each song and evaluated using the Jamendo dataset from MIREX 2019. Since the Jamendo dataset does not include the end time of a word, the $e^w$ has been configured as the start time of the next word. In FIG. 5, models according to an embodiment of the disclosure may be identified to show higher performance compared to existing models. An item marked as N/A in FIG. 5 is an item for which a measurement value has not been publicized as an open source, or an item that is not written in the paper in which a model is described.

The predictor trained according to the above embodiments may obtain information indicating a correlation between the pronunciation of each of the multiple frames of the first pronunciation information and the pronunciation of each of the multiple segments of the second audio pronunciation information, and may synchronize the text with the audio signal according to the information indicating the correlation.

An audio signal processing device according to an embodiment of the disclosure includes at least one processor. The operations of audio signal processing described in the disclosure may be operations of an instruction set operating on the processor included in the audio signal processing device.

Some embodiments may also be implemented in the form of a recording medium including computer-executable instructions, such as a program module executed by a computer. The computer-readable medium may be any available medium that is accessible by a computer, and may include both volatile and non-volatile media, and removable and non-removable media. Further, the computer-readable medium may include a computer storage medium. The computer storage medium may include both volatile and non-volatile media, and removable and non-removable media implemented in any method or technology for storage of information such as computer-readable instructions, data structures, program modules, or other data.

Although the disclosure has been described above with reference to specific embodiments, those skilled in the art may make modifications and changes without departing from the spirit and scope of the disclosure. In other words, although the disclosure has been described with reference to an embodiment of loudness level correction for audio signals, the disclosure is equally applicable and extensible to various multimedia signals, including video signals as well as audio signals. Therefore, matters that can be easily inferred by a person skilled in the art to which the disclosure pertains from the detailed description and embodiments of the disclosure shall be construed as falling within the scope of the disclosure.

What is claimed is:

1. An audio signal processing device for synchronizing an audio signal and text with a speech signal, the audio signal comprising speech and the text corresponding to the speech, and the device comprising a processor, wherein the processor is configured to:

obtain first audio pronunciation information corresponding to the speech, the first audio pronunciation information being divided with regard to multiple frames included in the audio signal;

convert the text to a code, and obtain first text pronunciation information based on the converted code, wherein the first text pronunciation information is divided with regard to multiple segments and the converted code is an international phonetic alphabet (IPA);

obtain, by using a neural network model, a similarity between second audio pronunciation information, which is a feature extracted from each of the multiple frames of the first audio pronunciation information, and second text pronunciation information, which is a feature extracted from each of the multiple segments of the first text pronunciation information;

based on the similarity, obtain a time stamp indicating a time at which each of the multiple segments of the text corresponding to each of the multiple segments of the second text pronunciation information corresponds to an audio signal; and synchronize the text with the speech signal according to time stamp, wherein the neural network model has a UNet structure, wherein the UNet comprises a CNN and an RNN, and wherein, within a layer included in the UNet, the CNN performs analysis on a local similarity region, and the RNN performs analysis on a global similarity region.

2. The audio signal processing device of claim 1, wherein the processor is configured to extract the speech from a component representing a language uttered in the audio signal.

3. The audio signal processing device of claim 1, wherein the correlation between the second audio pronunciation information and the second text pronunciation information is a cross-correlation.

4. The audio signal processing device of claim 1, wherein the neural network model is trained using a loss function having, as an output value, a difference between a time at which speech corresponding to each of the multiple segments of the text is uttered in the audio signal and a predicted time at which each of the multiple segments of the text is expected to be synchronized with the audio signal.

5. The audio signal processing device of claim 4, wherein the loss function uses cross-entropy.

6. A machine learning device for generating a neural network model configured to synchronize an audio signal and text with a speech signal, the audio signal comprising speech and the text corresponding to the speech, and the device comprising a processor, wherein the processor is configured to:

obtain first audio pronunciation information corresponding to the speech, the first audio pronunciation information being divided with regard to multiple frames included in the audio signal;

convert the text to a code, and obtain first text pronunciation information based on the converted code, wherein the first text pronunciation information is divided with regard to multiple segments and the converted code is an international phonetic alphabet (IPA);

obtain a similarity between second audio pronunciation information, which is a feature extracted from each of the multiple frames of the first audio pronunciation information, and second text pronunciation information, which is a feature extracted from each of the multiple segments of the first text pronunciation information;

based on the similarity, obtain a time stamp indicating a time at which each of the multiple segments of the text corresponding to each of the multiple segments of the second text pronunciation information corresponds to an audio signal; and learn to synchronize the text with the audio signal according to the information indicating the similarity, wherein the neural network model has a UNet structure, wherein the UNet comprises a CNN and an RNN, and wherein, within a layer included in the UNet, the CNN performs analysis on a local similarity region, and the RNN performs analysis on a global similarity region.

7. The machine learning device of claim 6, wherein the processor is configured to extract the speech from a component representing a language uttered in the audio signal.

8. The machine learning device of claim 6, wherein the similarity between the second audio pronunciation information and the second text pronunciation information is a cross-correlation.

9. The machine learning device of claim 6, wherein the neural network model is trained using a loss function having, as an output value, a difference between a time at which speech corresponding to each of the multiple segments of text is uttered in the audio signal and a predicted time at which each of the multiple segments of text is expected to be synchronized with the audio signal.

10. The machine learning device of claim 9, wherein the loss function uses cross-entropy.

* * * * *